(12) United States Patent
Iwasaki et al.

(10) Patent No.: US 7,891,476 B2
(45) Date of Patent: Feb. 22, 2011

(54) AUTOMATIC TRANSMISSION

(75) Inventors: Tatsuhiko Iwasaki, Hiroshima (JP); Junichi Doi, Hiroshima (JP); Tatsutoshi Mizobe, Hiroshima (JP); Naohiro Sakaue, Hiroshima (JP)

(73) Assignee: Mazda Motor Corporation (JP)

( * ) Notice: Subject to any disclaimer, the term of this patent is extended or adjusted under 35 U.S.C. 154(b) by 670 days.

(21) Appl. No.: 11/876,954

(22) Filed: Oct. 23, 2007

(65) Prior Publication Data

US 2008/0108468 A1 May 8, 2008

(30) Foreign Application Priority Data

Nov. 7, 2006 (JP) ............... 2006-302121

(51) Int. Cl.
*F16D 25/0638* (2006.01)
(52) U.S. Cl. .................... 192/85.25; 475/146
(58) Field of Classification Search ......... 475/146; 192/48.611, 48.8, 85.25
See application file for complete search history.

(56) References Cited

U.S. PATENT DOCUMENTS

2004/0248684 A1 12/2004 Sugiura et al.
2006/0086586 A1* 4/2006 Braford ............... 192/87.11
2006/0144665 A1 7/2006 Janson et al.

FOREIGN PATENT DOCUMENTS

EP  1 195 537 A1  4/2002

OTHER PUBLICATIONS

Extended European Search Report dated Feb. 2, 2010: Application No. 07021346.7-2423 / Patent No. 1923590.

\* cited by examiner

*Primary Examiner*—David D Le
*Assistant Examiner*—Derek D Knight
(74) *Attorney, Agent, or Firm*—Studebaker & Brackett PC; Donald R. Studebaker

(57) ABSTRACT

Each of first and second multi-plate clutches comprises a clutch outer cylinder portion provided to be coaxial with the input shaft and connected with a first or second rotational element, a clutch inner cylinder portion provided to be coaxial with an input shaft, plural clutch plates provided between these cylinder portions to slide in an axial direction of the input shaft within the clutch outer or inner cylinder portion, and a clutch piston provided to slide in the axial direction and press the clutch plates for connecting the clutch outer cylinder portion with the clutch inner cylinder portion. The clutch outer and inner cylinder portions of each of the first and second multi-plate clutches are provided in the axial direction, and there is provided a support wall portion that is connected with the input shaft and supports the clutch inner cylinder portion of each of the multi-plate clutches.

10 Claims, 6 Drawing Sheets

|  | Clutch | | | Brake | |
|---|---|---|---|---|---|
|  | C1 | C2 | C3 | B1 | B2 |
| 1st |  | O |  |  | (O) |
| 2nd |  | O |  | O |  |
| 3rd |  | O | O |  |  |
| 4th | O | O |  |  |  |
| 5th | O |  | O |  |  |
| 6th | O |  |  | O |  |
| Reverse |  |  | O |  | O |

FIG. 2

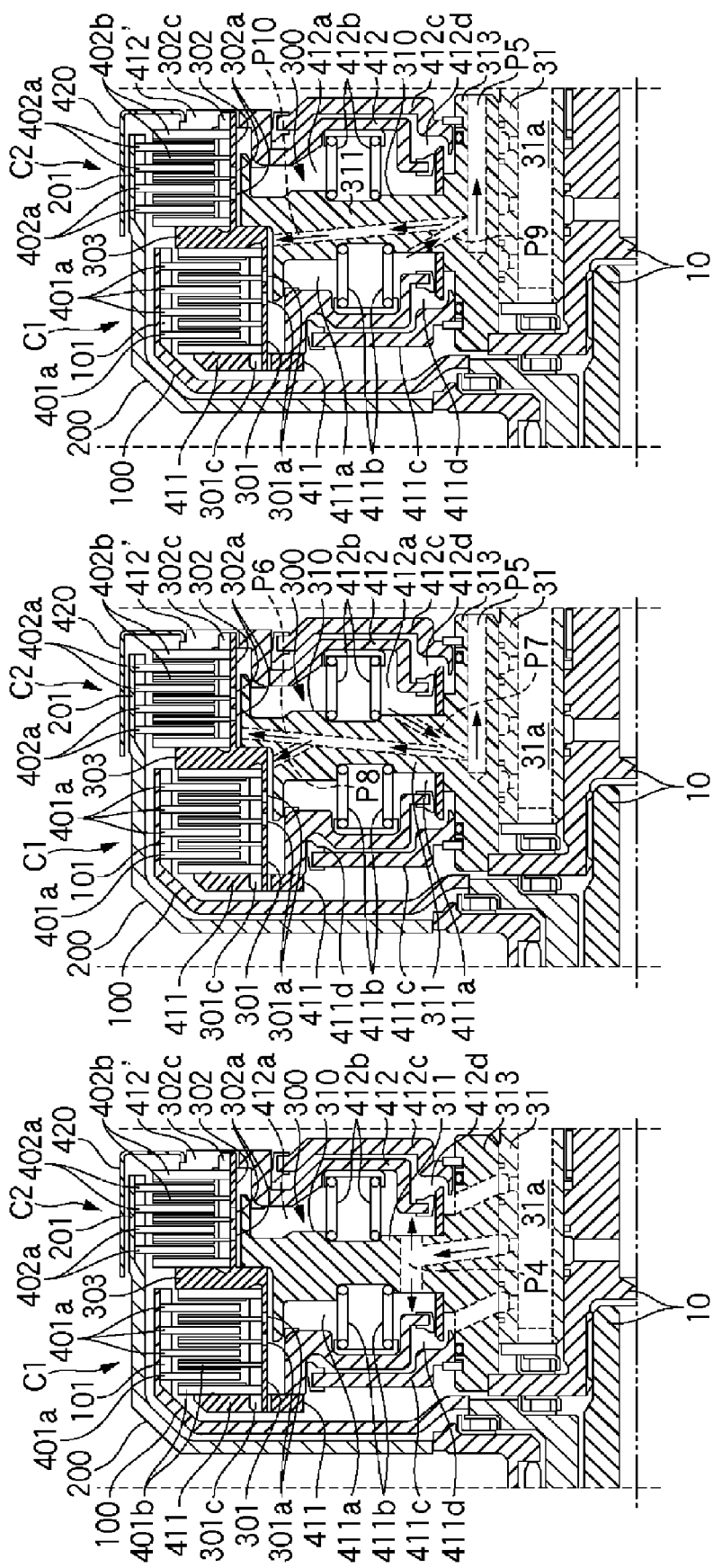

AUTOMATIC TRANSMISSION

BACKGROUND OF THE INVENTION

The present invention relates to an automatic transmission, and particularly relates to a structure of a multi-plate clutch.

Recently, the automatic transmission for a vehicle with a multi-speed shift, such as a six forward speeds or more, has become popular. Accordingly, the number of parts of a transmission gear mechanism comprised of planetary gears, brakes, clutches and the like has increased. U.S. Patent Application Publication No. 2004/0248684 A1, for example, discloses an automatic transmission with two sets of multi-plate clutches.

The increase of the number of parts causes a large size of the automatic transmission. Meanwhile, the compactness of the automatic transmission has been demanded from a vehicle layout standpoint. The above-described publication discloses the automatic transmission in which two sets of multi-plate clutches are provided side by side along its radial direction. In this case, while its axial-direction length (size) of the automatic transmission can be properly shortened, it may be difficult to make its radial-direction size compact.

SUMMARY OF THE INVENTION

Accordingly, an object of the present invention is to provide an automatic transmission with two sets of multi-plate clutches that can make its size properly compact.

According to the present invention, there is provided an automatic transmission, comprising an input shaft, a transmission gear mechanism, and first and second multi-plate clutches operative to connect or disconnect the input shaft with first and second rotational elements respectively that form the transmission gear mechanism, wherein each of the first and second multi-plate clutches comprises a clutch outer cylinder portion that is provided to be coaxial with the input shaft and connected with the first rotational element or the second rotational element, a clutch inner cylinder portion that is provided to be coaxial with the input shaft, plural clutch plates that are provided between the clutch outer cylinder portion and the clutch inner cylinder portion so as to slide in an axial direction of the input shaft within the clutch outer cylinder portion or the clutch inner cylinder portion, and a clutch piston that is provided so as to slide in the axial direction of the input shaft and press the clutch plates for connecting the clutch outer cylinder portion with the clutch inner cylinder portion, wherein the clutch outer cylinder portion and the clutch inner cylinder portion of each of the first and second multi-plate clutches are provided in the axial direction of the input shaft, and there is provided a support wall portion that is connected with the input shaft and supports the clutch inner cylinder portion of each of the first and second multi-plate clutches.

According to the above-described structure, since the clutch outer cylinder portion and the clutch inner cylinder portion of each of the first and second multi-plate clutches are provided in the axial direction of the input shaft, the radial-direction size of the automatic transmission can be made compact. Also, since the respective clutch inner cylinder portions of the first and second multi-plate clutches are supported by the common support wall portion, the axial-direction size of the automatic transmission can be made compact as well. Thus, the size of the automatic transmission equipped with the two sets of multi-plate clutches according to the present invention can be made properly compact.

According to an embodiment of the present invention, at a one side of the support wall portion is provided either one of the clutch pistons, and at the other side of the support wall portion is the other of the clutch pistons, the clutch pistons being provided such that connecting directions thereof are opposite to each other. Thereby, the compactness of the clutch pistons can be attained, thereby making the automatic transmission compact further.

According to another embodiment of the present invention, there are provided respective hydraulic chambers of the clutch pistons at both sides of the support wall portion. Thereby, the support wall portion can be also used as a partitioning wall to form the hydraulic chambers, thereby making the axial-direction size of the automatic transmission compact further.

According to another embodiment of the present invention, there is provided a retaining portion that is supported at the support wall portion and provided between the plural clutch plates of the first multi-plate clutch and the plural clutch plates of the second multi-plate clutch, the retaining portion being operative to restrict movements of the respective plural clutch plates by pressing of the respective clutch pistons. Thereby, since the retaining portion can be common to the first multi-plate clutches and the second multi-plate clutches, the axial-direction size of the automatic transmission can be made compact further.

According to another embodiment of the present invention, the clutch inner cylinder portion includes a cutout portion and a non-cutout portion at one end thereof, the cutout portion and the non-cutout portion being formed at plural portions of a periphery of the one end of the clutch inner cylinder portion, the cutout portion being formed in a cutout shape so as to extend in the axial direction of the input shaft, the clutch piston includes a passing portion through which the non-cutout portion passes, and the one end of the clutch inner cylinder portion and the clutch piston are disposed so as to overlap with each other. Thereby, since the one end of the clutch inner cylinder portion and the clutch piston are disposed so as to overlap with each other, ensuring the layout space for the clutch plates of the clutch inner cylinder portion, the axial-direction size of the automatic transmission can be made compact further.

According to another embodiment of the present invention, inside the clutch inner cylinder portion is provided a hydraulic chamber of the clutch piston into which a hydraulic fluid of the clutch piston is supplied. Thereby, since the hydraulic chamber is provided inside the clutch inner cylinder portion, the axial-direction size of the automatic transmission can be made compact further.

According to another embodiment of the present invention, inside the clutch inner cylinder portion is provided a centrifugal balance hydraulic chamber of the clutch piston. Thereby, since the centrifugal balance hydraulic chamber is provided inside the clutch inner cylinder portion, the axial-direction size of the automatic transmission can be made compact further.

According to another embodiment of the present invention, there is provided a boss portion which is connected to a transmission case of the automatic transmission and into which the input shaft is inserted, the support wall portion is provided on the boss portion so as to rotate and includes a piston support portion that supports the clutch piston so that the clutch piston can slide. Thereby, since the support wall portion is used as the support member for the clutch piston, the clutch piston can be disposed compactly.

Other features, aspects, and advantages of the present invention will become apparent from the following description which refers to the accompanying drawings.

BRIEF DESCRIPTION OF THE DRAWINGS

FIG. 2 is a chart showing a connection state of clutches and brakes of the automatic transmission A.

FIGS. 6A-6C are explanatory diagrams of fluid passages formed at a support wall portion 310.

DETAILED DESCRIPTION OF THE INVENTION

Hereinafter, a preferred embodiment of an automatic transmission according to the present invention will be descried referring to the accompanying drawings.

Figure 1:
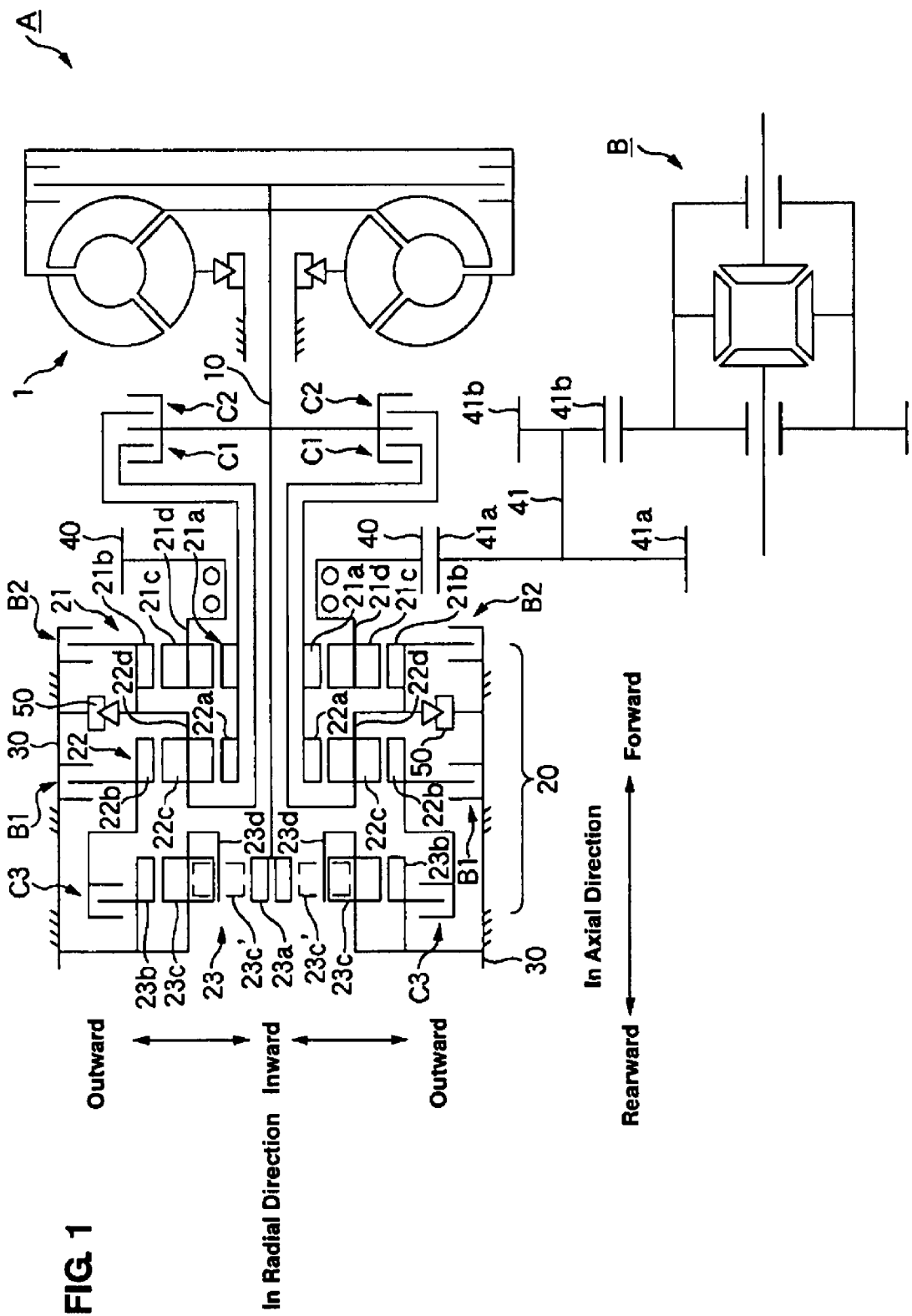
FIG. 1 is a skeleton diagram of an automatic transmission A and a differential gear B of an embodiment according to the present invention.

FIG. 1 is a skeleton diagram of an automatic transmission A and a differential gear B of an embodiment according to the present invention, and FIG. 2 is a chart showing a connection state of clutches and brakes of the automatic transmission A (○ indicates a connection state).

The automatic transmission A comprises a torque converter 1, an input shaft 10 to which an output of the torque converter 1 is conveyed, a transmission gear mechanism 20, multi-plate clutches C1-C3, brakes B1, B2, and a transmission case 30. Hereinafter, an axial direction or a radial direction of the input shaft 10 will be simply referred to as an "axial direction" or "radial direction." Further, "forward" or "rearward" of this axial direction and "outward" or "inward" of this radial direction will mean as indicated in FIG. 1.

The transmission gear mechanism 20 comprises three sets of planetary gears 21-23 that are provided to be coaxial with the input shaft 10 respectively. The planetary gears 21, 22, which are a single-pinion type of planetary gear, comprise respectively sun gears 21a, 22a, ring gears 21b, 22b, plural pinion gears 21c, 22c that engage with the sun gears 21a, 22a and the ring gears 21b, 22b, and carriers 21d, 22d that hold the plural pinion gears 21c, 22c. The sun gears 21a, 22a, ring gears 21b, 22b and carriers 21d, 22d are rotational elements that are provided to be coaxial with the input shaft so as to rotate.

The planetary gears 23, which is a double-pinion type of planetary gear, comprises a sun gear 23b, a ring gear 23b, plural pinion gears 23c, 23c' that are provided between the sun gear 23a and the ring gear 23b, and a carrier 23d that holds the plural pinion gears 23c, 23c'.

The multi-plate clutch C1 is operative to connect or disconnect the input shaft 10 with the carrier 22d of the planetary gear 22. The multi-plate clutch C2 is operative to connect or disconnect the input shaft 10 with the sun gear 21a of the planetary gear 21 and the sun gear 22a of the planetary gear 22. The clutch C3 is operative to connect or disconnect the ring gear 22b of the planetary gear 22 and the ring gear 23b of the planetary gear 23.

The brake B1 is operative to connect or disconnect the transmission case 30 with the ring gear 22b of the planetary gear 22. The brake B2 is operative to connect or disconnect the transmission case 30 with the ring gear 21b of the planetary gear 21.

The carrier 21d of the planetary gear 21 is connected to an output gear 40, so the output gear 40 is rotated by the carrier 21d. The output gear 40 is provided so as to rotate around an axis that is coaxial with the input shaft 10 and engage with a gear 41a of a secondary shaft 41, so a rotational force of the output gear 40 is conveyed to the secondary shaft 41. A gear 41b of the secondary shaft 41 engages with a gear of the differential gear B, so a rotational force of the secondary shaft 41 is conveyed to the differential gear B.

The sun gear 21a of the planetary gear 21 is connected with the sun gear 22a of the planetary gear 22. The ring gear 21b of the planetary gear 21 is connected with the carrier 22d of the planetary gear 22. These members 21b, 22d are connected with the transmission case 30 via a one-way clutch 50. The one-way clutch 50 allows a rotation of these members 21b, 22d in a one direction, but prevents the rotation of these members 21b, 22d in the opposite direction. The carrier 23d of the planetary gear 23 is connected with the transmission case 30 so as to be fixed to the transmission case 30. The sun gear 23a is connected with the input shaft 10 so as to rotate together with the input shaft 10.

The above-described automatic transmission A attains six forward speeds (1st-6th) and a single rearward speed by properly selecting the connection state of the multi-plate clutches C1-C3, brakes B1, B2 as shown in FIG. 2. For example, in case of the 2nd speed, the multi-plate clutch C2 and the brake B1 are selected to the connection state, and the multi-plate clutches C1, C3 and the brake B2 are selected to the release (disconnection) state.

In case of the 1st speed, the multi-plate clutch C2 is selected to the connection state and the multi-plate clutches C1, C3 and the brakes B1, B2 are selected to the release state in a normal drive mode. When an engine braking is needed (in a manual mode or the like), however, the multi-plate clutch C2 and the brake B2 are selected to the connection state. In this case, the one-way clutch 50 does not function, so the engine brake works more properly at the vehicle deceleration state than that in the normal drive mode.

Figure 3:
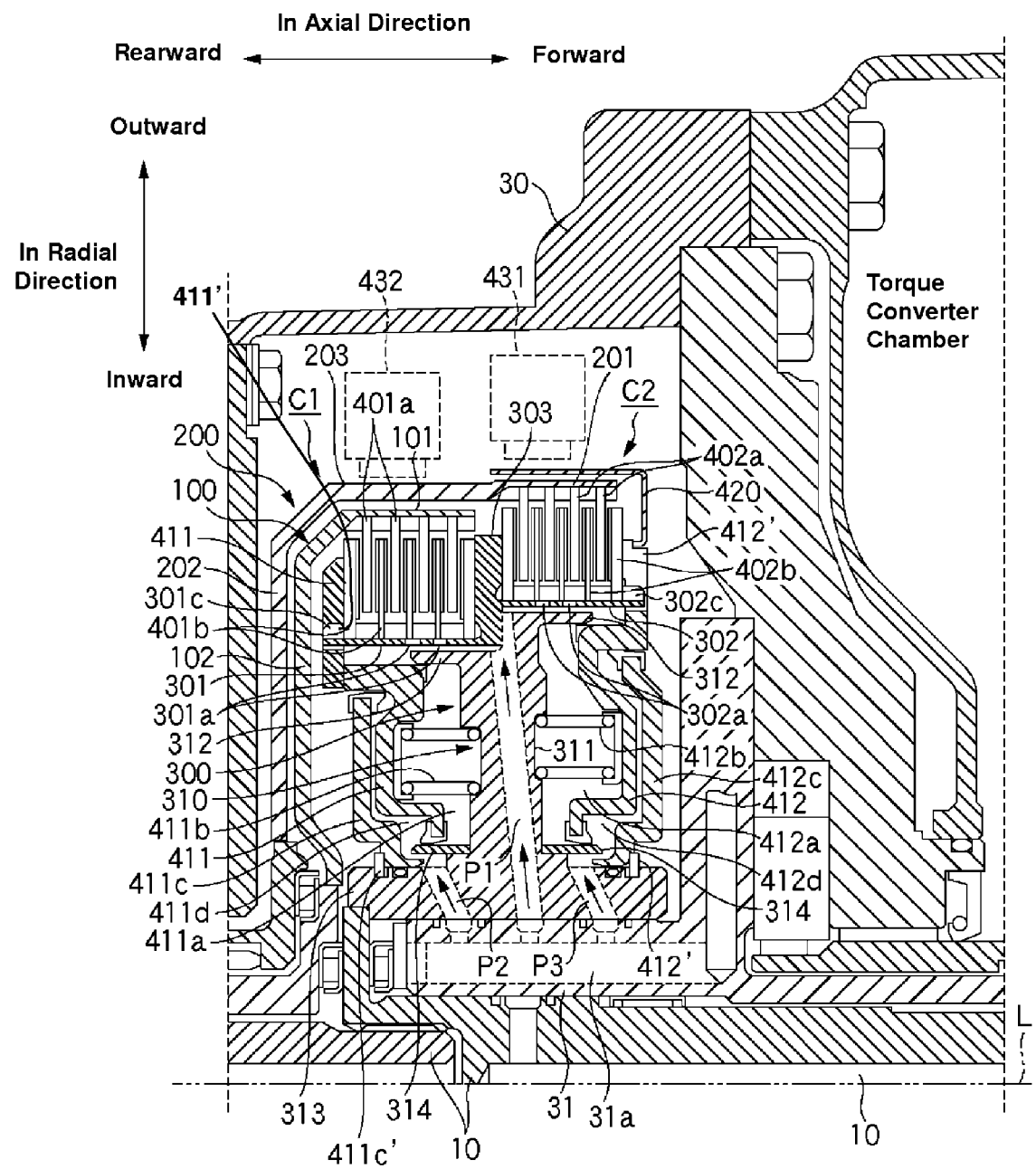
FIG. 3 is a sectional view of a portion of the automatic transmission A around multi-plate clutches C1 and C2.
Figure 4:
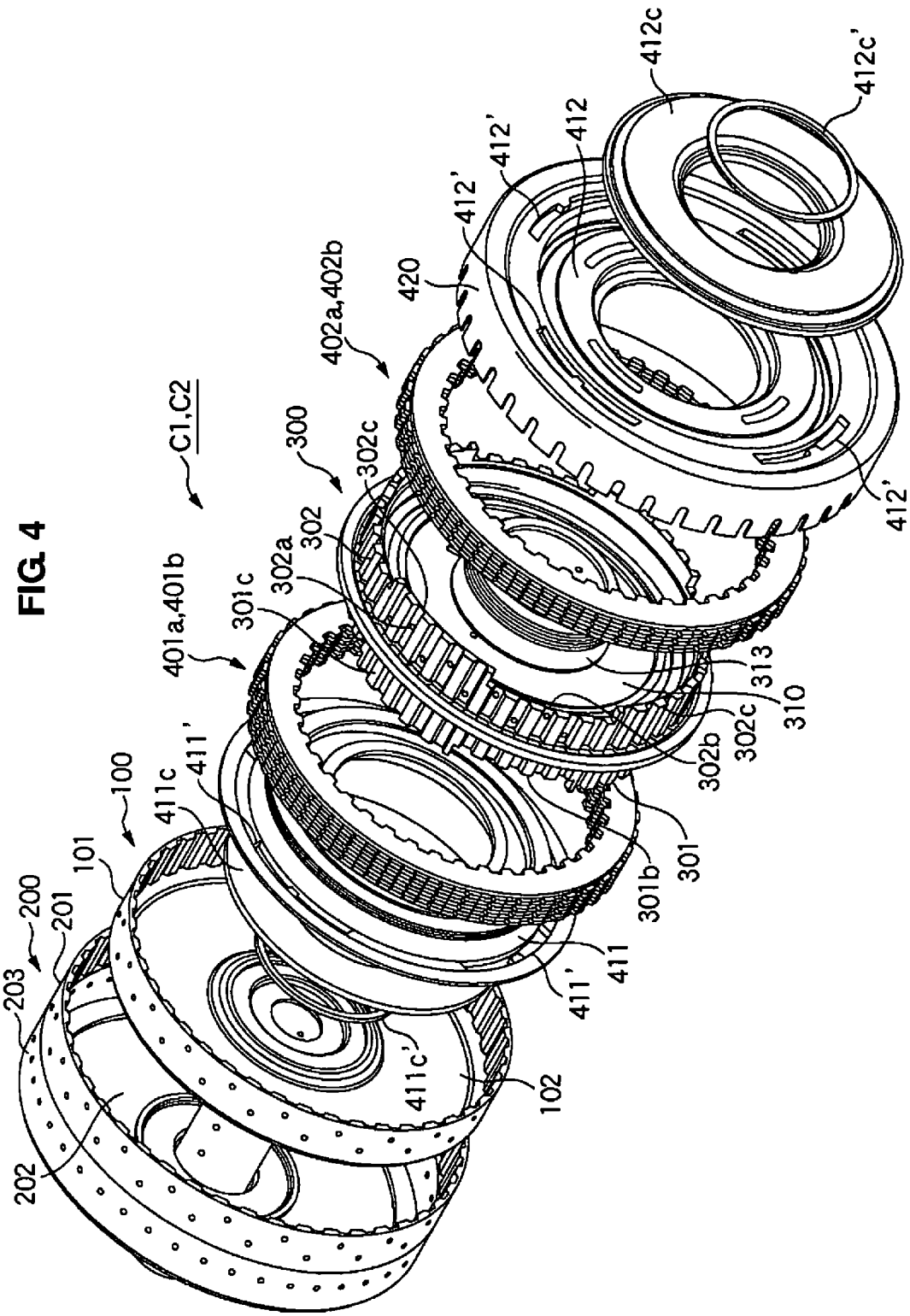
FIG. 4 is an exploded perspective view of the multi-plate clutches C1 and C2.
Figure 5:
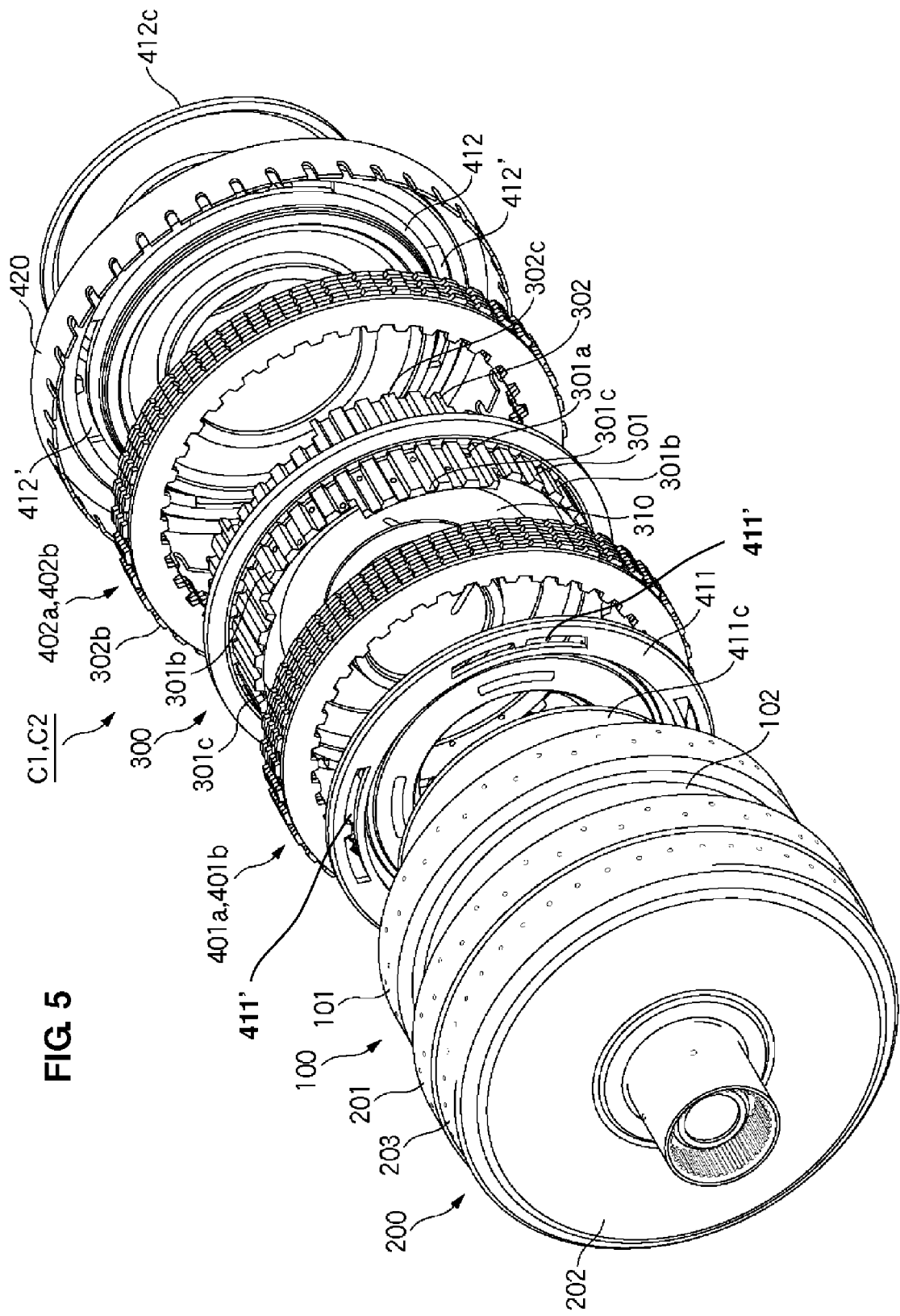
FIG. 5 is an exploded perspective view of the multi-plate clutches C1 and C2.

Next, the structure of the multi-plate clutches C1, C2 will be described referring to FIGS. 3-6A, 6B, 6C. FIG. 3 is a sectional view of a portion of the automatic transmission A around the multi-plate clutches C1 and C2 (a sectional view of its half part above an axial line L of the input shaft 10). FIG. 4 is an exploded perspective view of the multi-plate clutches C1 and C2, when viewed from the front, and FIG. 5 is an exploded perspective view of the multi-plate clutches C1 and C2, when viewed from the rear.

The multi-plate clutches C1 and C2 are accommodated in the transmission case 30. The transmission case 30 has a boss portion 31 at the center, which is integrated therewith and extends in the axial direction. The input shaft 10 is inserted into the boss portion 31. An oil (fluid) passage 10a is formed at the input shaft 10 to supply lubricating oil to a sliding face between the boss portion 31 and the input shaft 10. Herein, the input shaft 10 has a split structure in which its front portion and its rear portion are coupled to each other via a spline structure.

The multi-plate clutches C1 and C2 comprise clutch drums 100, 200, respectively. The clutch drums 100, 200 include axial-direction extending splines at respective inner peripheral faces. The drums 100, 200 comprise clutch outer cylinder portions 101, 201 that are formed to be coaxial with the input shaft 10, and side wall portions 102, 202 that extend in the radial direction from the inside, respectively. Both the clutch outer cylinder portions 101, 201 are disposed side by side without overlapping each other in the axial direction.

The clutch drum 200 further comprises an extending outer cylinder portion 203 that is disposed between the clutch outer cylinder portion 201 and the side wall portion 202 and formed to be coaxial with the input shaft 10. The clutch drum 100 is disposed inside the clutch drum 200.

The side wall portion 102 is connected with the carrier 22d of the rotational element of the transmission gear mechanism 20 that has been described referring to FIG. 1. The side wall portion 202 is connected with the sun gears 21a, 22a of the rotational elements of the transmission gear mechanism 20 that has been described referring to FIG. 1.

The multi-plate clutches C1, C2 comprise a clutch hub 300 that is common thereto. The clutch hub 300 includes axial-direction extending splines at an outer peripheral face. The hub 300 comprises clutch inner cylinder portions 301, 302 that are formed to be coaxial with the input shaft 10.

Both the clutch inner cylinder portions 301, 302 are disposed side by side without overlapping each other in the axial direction. The clutch inner cylinder portion 301 is disposed inside the clutch outer cylinder portion 101 so as to face it, which forms the multi-plate clutch C1. The clutch inner cylinder portion 302 is disposed inside the clutch outer cylinder portion 301 so as to face it, which forms the multi-plate clutch C2.

Thus, according to the present embodiment, the clutch outer cylinder portions 101, 201 and the clutch inner cylinder portions 301, 302 are provided in the axial direction of the input shaft 10. Thereby, the radial-direction size of the automatic transmission A can be made compact.

Between the clutch inner cylinder portions 301, 302 is provided a retaining portion 303 that is formed integrally with these. The clutch hub 300 is connected with the input shaft 10 and includes a support wall portion 310 to support the both clutch inner cylinder portions 301, 302 and the retaining portion 303.

Thus, according to the present embodiment, the both clutch inner cylinder portions 301, 302 of the multi-plate clutches C1, C2 are supported by the common support wall portion 310, and thereby the clutch hub 300 can be common to the both clutches C1, C2. Accordingly, the axial-direction size of the automatic transmission A can be made more compact than that of a transmission in which these clutches have different hubs, respectively.

The clutch inner cylinder portion 301 projects from the support wall portion 310 rearward in the axial direction. The clutch inner cylinder portion 302 projects from the support wall portion 310 forward in the axial direction. The support wall portion 310 comprises a body portion 311 that extends in the radial direction, projecting portions 312 that project forward and rearward respectively in the axial direction at an outer end of the body portion 311, and a sleeve portion 313 that extend forward and rearward respectively in the axial direction at an inner end of the body portion 311.

The boss portion 31 is inserted into the sleeve portion 313, and the support wall portion 310 (a whole part of the clutch hub 300) is provided so as to rotate on the boss portion 31. The support wall portion 310 is connected to the input shaft 10 by fixing a rearward side end portion of the sleeve portion 313 to the input shaft 10.

A slit is formed between the projecting portion 312 and the inner peripheral faces of the clutch inner cylinder portions 301, 302. Lubricating oil that flow in an oil passage P1 formed at the support wall portion 310 is supplied to this slit as cooling oil. The cooling oil is supplied to the oil passage P1 from a valve body, not illustrated, via one of plural oil passages 31a that are formed in a circumferential direction in the boss portion 31. The cooling oil in the slit is supplied outside the clutch inner cylinder portions 301, 302 via holes 301a, 302a that are respectively formed at the clutch inner cylinder portions 301, 302.

Herein, the above-described clutch inner cylinder portions 301, 302, retaining portion 303, and support wall portion 310 may be formed integrally as a single member.

Between the clutch outer cylinder portion 101 and the clutch inner cylinder portion 301 are disposed plural clutch plates 401a, 401b one after the other in the axial direction. Between the clutch outer cylinder portion 201 and the clutch inner cylinder portion 302 are disposed plural clutch plates 402a, 402b one after the other in the axial direction. The retaining portion 303 is provided between the clutch plates 401a, 401b and the clutch plates 402a, 402b.

The clutch plates 401a, 401b, 402a, 402b are formed in a circular shape, and a friction member is provided at a one side face or both side faces of the clutch plates 401b, 402b.

The clutch plates 401a, 402a have splines at the outer peripheral edges, respectively. The clutch plate 401a engages with the splines of the clutch outer cylinder portion 101 so that the clutch outer cylinder portion 101 can slide in the axial direction. The clutch plate 402a engages with the splines of the clutch outer cylinder portion 201 so that the clutch outer cylinder portion 201 can slide in the axial direction.

The clutch plates 401b, 402b have splines at the inner peripheral edges, respectively. The clutch plate 401b engages with the splines of the clutch inner cylinder portion 301 so that the clutch inner cylinder portion 301 can slide in the axial direction. The clutch plate 402b engages with the splines of the clutch inner cylinder portion 301 so that the clutch outer cylinder portion 201 can slide in the axial direction.

The multi-plate clutch C1 comprises a clutch piston 411 disposed on the rearward side of the support wall portion 310, and the multi-plate clutch C2 comprises a clutch piston 412 disposed on the forward side of the support wall portion 310. Thus, the clutch pistons 411, 412 are provided at both sides of the support wall portion 310 in the axial direction, respectively. Accordingly, the compactness of the clutch pistons 411, 412 can be properly attained compared to a case where these pistons are provided on one side, thereby making the automatic transmission A compact further.

The clutch pistons 411, 412 are provided to be movable in the axial direction with their slide contacts with an inner peripheral surface of the projecting portions 312 of the support wall portion 310 and an outer peripheral surface of portions 314 that are provided inside the body portion 311 of the support wall portion 310 so as to extend forward and rearward in the axial direction. That is, these portions 312, 314 of the support wall portion 310 function as a piston support portion to support the clutch pistons 411, 412 so that these clutch pistons can slide.

Thereby, since the support wall portion 310 is used as the support member, especially a common support member, for the clutch pistons 411, 412, the clutch pistons 411, 412 can be disposed compactly.

Between the body portion 311 of the support wall portion 310 and the clutch piston 411 is formed a centrifugal balance hydraulic chamber 411a, and a return spring 411b is provided in it. The centrifugal balance hydraulic chamber 411a is provided inside the clutch inner cylinder portion 301, and the side portion of the body portion 311 functions as a partitioning wall to form the hydraulic chamber 411a and also as a wall member to receive a reaction force of the return spring 411b. Since the centrifugal hydraulic chamber 411a is provided inside the clutch inner cylinder portion 301, it can be accommodated within the clutch inner cylinder portion 301c in the axial direction. Thus, the axial-direction size of the automatic transmission A can be made compact further.

As shown in FIG. 6A, an oil passage P4 is provided at a location of the support wall portion 310 which is different from a location of the oil passage P1. Operating oil (fluid) is supplied from the valve body, not illustrated, to the oil passage P4 via one of the plural oil passages 31a that are formed at the boss portion 31 in the peripheral direction. Then, the operating oil to cancel an oil pressure increased with an centrifugal force that is caused by the rotation of the clutch hub 300 is supplied into the hydraulic chamber 411a from the oil passage P4.

Behind the clutch piston 411 is provided a rings-shaped hydraulic-chamber partitioning wall 411c. The hydraulic-chamber partitioning wall 411c is fixed to the outer peripheral surface of the sleeve portion 313 of the support wall portion 310 at its inner end portion via a fixing ring 411c'. A hydraulic chamber 411d is formed between the clutch piston 411 and the hydraulic-chamber partitioning wall 411c. The hydraulic chamber 411d is provided inside the clutch inner cylinder portion 301, and the operating oil is supplied via an oil passage P2 formed at the support wall portion 310. Since the hydraulic chamber 411d is provided inside the clutch inner cylinder portion 301, it can be accommodated within the clutch inner cylinder portion 301c in the axial direction. Thus, the axial-direction size of the automatic transmission A can be made compact further.

The operating oil is supplied from the valve body, not illustrated, to the oil passage P2 via one of the plural oil passages 31a that are formed at the boss portion 31 in the peripheral direction.

The clutch piston 411 is moved forward in the axial direction by the operating oil supplied to the hydraulic chamber 411d, and it presses the rearmost clutch plate 401b forward. Herein, while the clutch plates 401a, 401b are moved forward by the pressing of the clutch piston 411, their movements are restricted by the retaining portion 303. Thereby, they are held by the clutch piston 411 and the retaining portion 303, so the clutch outer cylinder portion 101 and the clutch inner cylinder portion 301 are interconnected. That is, the input shaft 10 and the clutch drum 100 are made in the connection state. A frictional heat generated by the clutch plates 401a, 401b is cooled by cooling oil supplied from the hole 301a.

The clutch inner cylinder portion 301 includes a cutout portion 301b and a non-cutout portion 301c at its rearward end. The cutout portion 301b is formed at plural portions of the periphery of the rearward end of the clutch inner cylinder portion 301. Thus, the width of clutch inner cylinder portion 301 in the axial direction is relatively short at a portion where the cutout portion 301b is formed, and it is relatively long at a portion where the non-cutout portion 301c is formed.

Meanwhile, the clutch piston 411 includes a cutout-shaped passing portion 411' through which the non-cutout portion 301c passes at plural portions of the periphery of its outer end portion to press the clutch plate 401b. Thus, the rearward end of the clutch inner cylinder portion 301 and a portion of the clutch piston 411 are disposed so as to overlap with each other.

According to the present embodiment, since the rearward end of the clutch inner cylinder portion 301 and the clutch piston 411 are disposed so as to overlap with each other, ensuring the layout space for the clutch plates 401a, 401b of the clutch inner cylinder portion 301, the axial-direction size of the automatic transmission A can be made compact further.

Between the forward side portion of the body portion 311 of the support wall portion 310 and the clutch piston 412 is formed a centrifugal balance hydraulic chamber 412a, and a return spring 412b is provided in it. The centrifugal balance hydraulic chamber 412a is provided inside the clutch inner cylinder portion 301, and like the case of the centrifugal balance hydraulic chamber 411a, the axial-direction size of the automatic transmission A can be made compact further.

The side portion of the body portion 311 functions as a partitioning wall to form the centrifugal balance hydraulic chamber 412a and also as a wall member to receive a reaction force of the return spring 412b. That is, in the present embodiment, the support wall portion 310 is used commonly as the partitioning wall to form the centrifugal hydraulic chambers 411a, 412a and also as the wall member to receive the reaction force of the return springs 412b, 412b. Herein, the operating oil is supplied to the centrifugal balance hydraulic chamber 412a via the oil passage P4 described referring to FIG. 6A.

According to the present embodiment, since the support wall portion 310 is used commonly as the partitioning wall to form the respective hydraulic chambers (the centrifugal hydraulic chambers 411a, 412a) and also as the wall member to receive the reaction force of the two return springs 412b, 412b, the axial-direction size of the automatic transmission A can be made compact further compared to a case where the wall members are provided separately.

Behind the clutch piston 412 is provided a ring-shaped hydraulic-chamber partitioning wall 412c. The hydraulic-chamber partitioning wall 412c is fixed to the outer peripheral surface of the sleeve portion 313 of the support wall portion 310 at its inner end portion via a fixing ring 412c'. A hydraulic chamber 412d is formed between the clutch piston 412 and the hydraulic-chamber partitioning wall 412c. The hydraulic chamber 412d is provided inside the clutch inner cylinder portion 302, and the operating oil is supplied to the hydraulic chamber 412d. Since the hydraulic chamber 412d is provided inside the clutch inner cylinder portion 302, the axial-direction size of the automatic transmission A can be made compact further, like the case of the hydraulic chamber 411d.

To the hydraulic chamber 412d is supplied the operating oil via an oil passage P3 that is formed at the support wall portion 310. The operating oil is supplied from the valve body, not illustrated, to the oil passage P3 via one of the plural oil passages 31a at the boss portion 31 in the peripheral direction.

The clutch piston 412 is moved rearward in the axial direction by the operating oil supplied to the hydraulic chamber 412d, and it presses the rearmost clutch plate 402b rearward. Namely, the connection directions of the clutch piston 411 and the clutch piston 412 are opposite to each other.

Herein, while the clutch plates 402a, 402b are moved rearward by the pressing of the clutch piston 412, their movements are restricted by the retaining portion 303. Thereby, they are held by the clutch piston 412 and the retaining portion 303, so the clutch outer cylinder portion 201 and the clutch inner cylinder portion 302 are interconnected. That is, the input shaft 10 and the clutch drum 200 are made in the connection state. A frictional heat generated by the clutch plates 402a, 402b is cooled by cooling oil supplied from the hole 302a.

According to the present embodiment, since the multi-plate clutches C1, C2 use the retaining portion 303 commonly, the axial-direction size of the automatic transmission A can be made compact further compared to the case where the clutches C1, C2 have their retaining portions respectively.

Like the clutch inner cylinder portion 301, the clutch inner cylinder portion 302 includes a cutout portion 302b and a non-cutout portion 302c at its forward end. Thus, the width of clutch inner cylinder portion 302 in the axial direction is relatively short at a portion where the cutout portion 302b is formed, and it is relatively long at a portion where the non-cutout portion 302c is formed.

Meanwhile, like the clutch piston 411, the clutch piston 412 includes a cutout-shaped passing portion 412' through which the non-cutout portion 302c passes at plural portions of the periphery of its outer end portion to press the clutch plate 402b. Thus, the forward end of the clutch inner cylinder portion 302 and a portion of the clutch piston 412 are disposed so as to overlap with each other.

According to the present embodiment, since the rearward end of the clutch inner cylinder portion 302 and the clutch piston 412 are disposed so as to overlap with each other, ensuring the layout space for the clutch plates 402a, 402b of the clutch inner cylinder portion 302, the axial-direction size of the automatic transmission A can be made compact further.

To an outer end of the clutch piston 412 is coupled a detected member 420. The detected member 420 is provided so that its cylindrical portion extends rearward in the axial direction to cover the clutch outer cylinder portion 201. A rotational speed of the member 420 is detected by a rotational speed detecting sensor 431 (a magnetic sensor, for example) that is disposed in the transmission case 30. The clutch hub 300 rotates together with the input shaft 10 in the present embodiment, so the rotational speed of the detected member 420 is equivalent to the rotational speed of the input shaft 10. The cylindrical portion of the detected member 420 extends rearward in the axial direction as described above, so that the detected member 420 can be accommodated within an axial-direction disposition space of the multi-plate clutches C1, C2.

A rotational speed detecting sensor 432 (a magnetic sensor, for example) is also disposed in the transmission case 30. The sensor 432 detects a rotational speed of the clutch drum 200. Detection results of these sensors 431, 432 are used for the control of the automatic transmission A.

Next, other oil passages formed at the support wall portion 310 will be described referring to FIGS. 6A and 6B. FIG. 6B shows an example that oil passages P5 to P8 are provided at the support wall portion 310. The oil passage P7 is connected to the oil passage P5, and these passages are oil passages to drain the operating oil from the centrifugal balance hydraulic chamber 412a. Herein, when the operating oil is supplied into the hydraulic chamber 412d and moves the clutch piston 412 in the connection direction, namely when the multi-plate clutch C2 is connected, the volume of the centrifugal balance hydraulic chamber 412a is reduced, thereby increasing the amount of the oil drained to the oil passage P7.

The operating oil drained to the oil passage P7 is used as the cooling oil for the clutch plates 402a, 402b, and the oil passage P6 is formed to increase the amount of the cooling oil. The oil passage P6 is connected to the oil passage P7, and part of the operating oil drained to the oil passage P7 is supplied, as the cooing oil, to the clutch plates 402a, 402b through the oil passage P6 and the hole 302a.

Herein, it may be difficult (not realistic) to form the oil passages P6, P7 with a drill processing by aligning both front ends of those drill holes. Accordingly, in the present embodiment, front end portions of the oil passages P6, P7 are disposed so as to correspond to the oil passage P5. Thereby, both the oil passages P6, P7 may be surely connected to each other via the oil passage P5 even if the drill processing is not so accurate.

Further, the oil passage P8 is formed to branch from the oil passage P6. Thus, part of the operating oil supplied to the oil passage P6 is supplied, as the cooing oil, to the clutch plates 401a, 401b through the oil passage P8 and the hole 301a.

As shown in the connection state chart of FIG. 2, the multi-plate clutch C1 is in the connection state with higher speeds compared to the multi-plate clutch C2. Accordingly, the clutch C1 generates the friction heat more, and therefore the clutch plates 401a, 401b of the clutch C1 need to be cooled more. For this reason, the oil passage P8 is formed to branch from the oil passage P6, thereby supplying more cooling oil to the clutch plates 401a, 401b of the multi-plate clutch C1.

Further, according to the present embodiment, as shown in the connection state chart of FIG. 2, both the multi-plate clutches C1, C2 are in the connection state at the 4th speed, while the multi-plate clutch C1 is in the release state at the 3rd speed. Generally, it is preferable that the cooling of the clutch plate be conduced not only in the connection state but in the release (partial release) state. According to the present embodiment, when the shift change is conducted from the 4th speed to the 3rd speed, the operating oil from the centrifugal balance hydraulic chamber 412a is supplied as the cooling oil to the clutch plates 401a, 401b of the multi-plate clutch C1 via a path flowing down the oil passage P7, the oil passage P8, and the hole 301a. Thereby, the cooling of the release-state multi-plate clutch C1 can be improved.

FIG. 6C shows an example that oil passages P5, P9 and P10 are provided at the support wall portion 310. The oil passage P9 is connected to the oil passage P5, and these passages are oil passages to drain the operating oil from the centrifugal balance hydraulic chamber 411a. The oil passage 10 is, like the above-described oil passage P6, the passage to supply the operating oil of the centrifugal balance hydraulic chamber 411a to the clutch plates 401a, 401b as the cooling oil when the multi-plate clutch C1 is in the connection state.

In the example of FIG. 6C, the oil passage P10 has no branch passage, so there is no oil passage (an oil passage to supply the cooling oil to the multi-plate clutch C2) that corresponds to the oil passage P8 of FIG. 6B. This is because the multi-plate clutch C2 is in the connection state with lower speeds compared to the clutch C1. Accordingly, less friction heat is generated, so the necessity of cooling is lower. However, an oil passage corresponding to the oil passage P8 may be provided at needs.

According to the present embodiment described above, since the support wall portion 310 supports the clutch inner cylinder portions 301, 302, it can be utilized as the portion at which the oil passages for the cooling of the clutch plates are formed. Also, since the hydraulic chambers (the centrifugal balance hydraulic chambers 411a, 412d) are provided at the both sides of the body portion 311 of the support wall portion 310, the operating oil of these hydraulic chambers can be utilized via the oil passages formed at the support wall portion 310 as the cooling oil for the clutch plates.

The present invention should not be limited to the above-described embodiment, but any other modifications and improvements may be applied within the scope of a spirit of the present invention.

What is claimed is:

1. An automatic transmission, comprising:
   an input shaft;
   a transmission gear mechanism; and
   first and second multi-plate clutches operative to connect or disconnect the input shaft with first and second rotational elements respectively that form the transmission gear mechanism,
   wherein each of the first and second multi-plate clutches comprises a clutch outer cylinder portion that is provided to be coaxial with the input shaft and connected with the first rotational element or the second rotational element, a clutch inner cylinder portion that is provided to be coaxial with the input shaft, plural clutch plates that are provided between the clutch outer cylinder portion and the clutch inner cylinder portion so as to slide in an axial direction of the input shaft within the clutch outer cylinder portion or the clutch inner cylinder portion, and a clutch piston that is provided so as to slide in the axial direction of the input shaft and press the clutch plates for connecting the clutch outer cylinder portion with the clutch inner cylinder portion, wherein the clutch outer cylinder portion and the clutch inner cylinder portion of each of said first and second multi-plate clutches are provided in the axial direction of the input shaft, and there is provided a support wall portion that is connected with the input shaft and supports the clutch inner cylinder portion of each of the first and second multi-plate clutches, wherein at a one side of said support wall portion is provided either one of said clutch pistons, and at the other side of the support wall portion is the other of the clutch pistons, the clutch pistons being provided such that connecting directions thereof are opposite to each other, wherein there is provided a retaining portion that is supported at said support wall portion and provided between the plural clutch plates of the first multi-plate clutch and the plural clutch plates of the second multi-plate clutch, the retaining portion being operative to restrict movements of the respective plural clutch plates by pressing of the respective clutch pistons, and wherein said clutch inner cylinder portion includes a cutout portion and a non-cutout portion at one end thereof, the cutout portion and the non-cutout portion being formed at plural portions of a periphery of the one end of the clutch inner cylinder portion, the cutout portion being formed in a cutout shape so as to extend in the axial direction of the input shaft, said clutch piston includes a passing portion through which said non-cutout portion passes, and said one end of the clutch inner cylinder portion and the clutch piston are disposed so as to overlap with each other.

2. The automatic transmission of claim 1, wherein there are provided respective hydraulic chambers of the clutch pistons at both sides of said support wall portion.

3. The automatic transmission of claim 2, wherein there is provided a boss portion which is connected to a transmission case of the automatic transmission and into which the input shaft is inserted, said support wall portion is provided on the boss portion so as to rotate and includes a piston support portion that supports the clutch piston so that the clutch piston can slide.

4. The automatic transmission of claim 3, wherein inside the clutch inner cylinder portion is provided a hydraulic chamber of the clutch piston into which a hydraulic fluid of the clutch piston is supplied.

5. The automatic transmission of claim 3, wherein inside the clutch inner cylinder portion is provided a centrifugal balance hydraulic chamber of the clutch piston.

6. An automatic transmission, comprising:
an input shaft;
a transmission gear mechanism; and
first and second multi-plate clutches operative to connect or disconnect the input shaft with first and second rotational elements respectively that form the transmission gear mechanism, wherein each of the first and second multi-plate clutches comprises a clutch outer cylinder portion that is provided to be coaxial with the input shaft and connected with the first rotational element or the second rotational element, a clutch inner cylinder portion that is provided to be coaxial with the input shaft, plural clutch plates that are provided between the clutch outer cylinder portion and the clutch inner cylinder portion so as to slide in an axial direction of the input shaft within the clutch outer cylinder portion or the clutch inner cylinder portion, and a clutch piston that is provided so as to slide in the axial direction of the input shaft and press the clutch plates for connecting the clutch outer cylinder portion with the clutch inner cylinder portion, wherein the clutch outer cylinder portion and the clutch inner cylinder portion of each of said first and second multi-plate clutches are provided in the axial direction of the input shaft, and there is provided a support wall portion that is connected with the input shaft and supports the clutch inner cylinder portion of each of the first and second multi-plate clutches, wherein at a one side of said support wall portion is provided either one of said clutch pistons, and at the other side of the support wall portion is the other of the clutch pistons, the clutch pistons being provided such that connecting directions thereof are opposite to each other, and wherein said clutch inner cylinder portion includes a cutout portion and a non-cutout portion at one end thereof, the cutout portion and the non-cutout portion being formed at plural portions of a periphery of the one end of the clutch inner cylinder portion, the cutout portion being formed in a cutout shape so as to extend in the axial direction of the input shaft, said clutch piston includes a passing portion through which said non-cutout portion passes, and said one end of the clutch inner cylinder portion and the clutch piston are disposed so as to overlap with each other.

7. The automatic transmission of claim 6, wherein there are provided respective hydraulic chambers of the clutch pistons at both sides of said support wall portion.

8. The automatic transmission of claim 7, wherein there is provided a boss portion which is connected to a transmission case of the automatic transmission and into which the input shaft is inserted, said support wall portion is provided on the boss portion so as to rotate and includes a piston support portion that supports the clutch piston so that the clutch piston can slide.

9. The automatic transmission of claim 8, wherein inside the clutch inner cylinder portion is provided a hydraulic chamber of the clutch piston into which a hydraulic fluid of the clutch piston is supplied.

10. The automatic transmission of claim 8, wherein inside the clutch inner cylinder portion is provided a centrifugal balance hydraulic chamber of the clutch piston.

* * * * *